United States Patent
Skirda et al.

(10) Patent No.: US 8,730,701 B2
(45) Date of Patent: May 20, 2014

(54) DRIVING CIRCUIT FOR POWERING A BI-DIRECTIONAL LOAD

(75) Inventors: Anatoly Skirda, Hermantown, MN (US); Eugene Tokhtuev, Duluth, MN (US); Christopher Owen, Duluth, MN (US); Viktor Slobodyan, Duluth, MN (US)

(73) Assignee: Ecolab USA Inc., St. Paul, MN (US)

( * ) Notice: Subject to any disclaimer, the term of this patent is extended or adjusted under 35 U.S.C. 154(b) by 794 days.

(21) Appl. No.: 12/370,362

(22) Filed: Feb. 12, 2009

(65) Prior Publication Data
US 2010/0202172 A1    Aug. 12, 2010

(51) Int. Cl.
*H02M 7/5387*    (2007.01)

(52) U.S. Cl.
USPC ................. 363/132; 363/98; 62/3.2

(58) Field of Classification Search
USPC ............. 363/56.02–56.11, 89, 131
See application file for complete search history.

(56) References Cited

U.S. PATENT DOCUMENTS

| | | | |
|---|---|---|---|
| 3,942,515 A * | 3/1976 | Servos et al. ................. 600/555 |
| 4,628,277 A | 12/1986 | Hill et al. | |
| 4,916,599 A | 4/1990 | Traxler et al. | |
| 5,057,720 A | 10/1991 | Hattori | |
| 5,088,098 A | 2/1992 | Muller et al. | |
| 5,343,382 A * | 8/1994 | Hale et al. ....................... 363/98 |
| 5,450,727 A | 9/1995 | Ramirez et al. | |
| 5,603,570 A | 2/1997 | Shimizu | |
| 5,952,856 A | 9/1999 | Horiguchi et al. | |
| 6,147,545 A | 11/2000 | Marshall | |
| 6,175,256 B1 | 1/2001 | Miettinen | |
| 6,205,790 B1 | 3/2001 | Denkin et al. | |
| 6,307,409 B1 | 10/2001 | Wrathall | |
| 6,687,142 B2 * | 2/2004 | Scott ............................... 363/97 |
| 6,981,381 B1 * | 1/2006 | Wang et al. ...................... 62/3.2 |
| 7,024,864 B2 | 4/2006 | Alfrey | |
| 7,115,922 B2 | 10/2006 | Nadd et al. | |
| 7,236,003 B2 | 6/2007 | Chellamuthu et al. | |
| 2002/0121094 A1 | 9/2002 | VanHoudt | |
| 2007/0079616 A1 * | 4/2007 | Deal ................................ 62/3.7 |
| 2007/0297205 A1 * | 12/2007 | Chen et al. ..................... 363/132 |
| 2008/0157830 A1 * | 7/2008 | Kume .............................. 327/110 |
| 2009/0066265 A1 * | 3/2009 | Imanaka et al. .............. 315/307 |
| 2010/0014336 A1 * | 1/2010 | Fukumoto ..................... 363/132 |

FOREIGN PATENT DOCUMENTS

EP    0395259    10/1990

OTHER PUBLICATIONS

PCT/IB2010/050640, International Search Report and Written Opinion dated Oct. 12, 2010, 9 pages.

* cited by examiner

*Primary Examiner* — Adolf Berhane
*Assistant Examiner* — Gustavo Rosario Benitez
(74) *Attorney, Agent, or Firm* — Fredrikson & Byron, P.A.

(57) ABSTRACT

An H-bridge control circuit comprises an input stage, comparator stage, inverter stage. The operation of the H-bridge can be controlled by a single analog input signal provided by a feedback stage. Shoot-through protection is provided for the H-bridge circuit through the inclusion of a dead gap determined by inputs to the comparator stage. The dead gap can be adjusted, allowing for adjustment of the precision operation of the load. The H-bridge can be used to drive a bi-directional load such as, for example, a Peltier conditioner.

12 Claims, 6 Drawing Sheets

DRIVING CIRCUIT FOR POWERING A BI-DIRECTIONAL LOAD

TECHNICAL FIELD

The invention relates to an H-bridge control circuit. More specifically, the invention relates to a circuit and methods for controlling the operation of a thermoelectric device.

BACKGROUND

The H-bridge is a commonly known circuit which can be utilized as a driver to change the polarity of power delivered to a load using a unipolar power supply.

Figure 1:
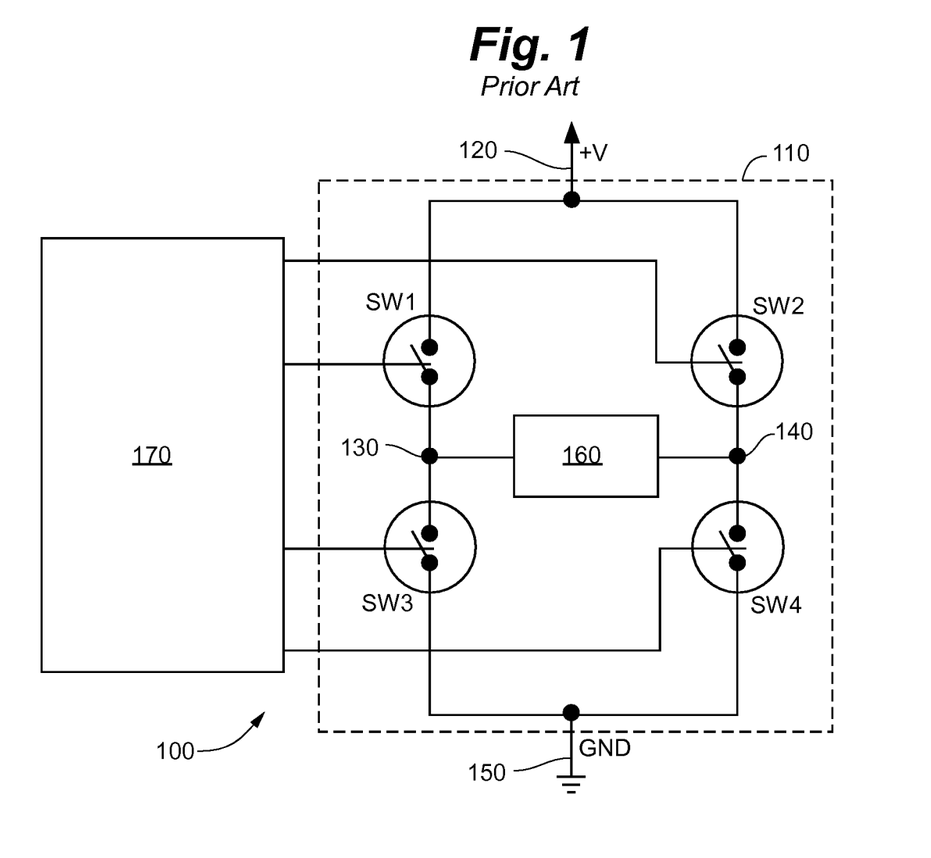
FIG. 1 is schematic of an H-bridge control system.

The operation of an exemplary H-bridge circuit will be discussed with respect to the circuit 100 of FIG. 1, which has been provided for reference only and is not intended to limit the scope of the disclosure. A typical H-bridge 110, includes a first switch SW1 connected between the power supply 120 and a first node 130, a second switch SW2 connected between the power supply 120 and a second node 140, a third switch SW3 connected between the first node 130 and ground 150, and a fourth switch SW4 connected between the second node 140 and ground 150. A load 160 is connected to the H-bridge between the first node 130 and the second node 140. A control circuit 170 manipulates the state of each of the switches so that at a given moment, only selected ones of the switches are closed (conductive). For example, if the first and fourth switches SW1, SW4 are closed and the second and third switches SW2, SW3 are open (non-conductive), the load 160 is powered with a polarity such that the potential at the first node 130, e.g. +V, is greater than the potential at the second node 140, e.g. ground. Conversely, opposite polarity at the load 160 (i.e. greater potential at the second node 140, e.g. +V, than at the first node 130, e.g. Ground) can be achieved by closing the second and third switches SW2, SW3 and opening the first and fourth switches SW1, SW4.

The control circuit 170 should operate such that switches along the same side of the H-bridge (i.e. first and third switches SW1, SW3, or second and fourth switches SW2, SW4) are not closed at the same moment. If this happens, a current could flow directly through both pairs of switches to ground without passing through the load 160. Such a situation is called "shoot-through current." Shoot-through current is undesirable because it can cause excessive current through the switches, possibly destroying them, and overloading the power supply.

Existing control circuits aimed at preventing shoot-through current require the use of complicated digital logic. Others contain simpler shoot-through current prevention circuits, but require multiple input signals to operate. Some control circuits fail to properly prevent shoot-through current in the case that the control circuit is disconnected from feedback.

SUMMARY

In one aspect, the invention features an electronic circuit for powering a bi-directional load. The circuit includes an H-bridge and an H-bridge control circuit. The H-bridge control circuit includes a feedback stage, an input stage, a comparator stage, and an inverter stage. The feedback stage is operatively connected with the input stage to provide an analog input signal indicative of the operation of the bi-directional load. The input stage provides a control signal based upon the analog input signal. First and second reference signals are also provided by the input stage. At the comparator stage, the control signal is compared with each of the reference signals. At the inverter stage, the outputs of the comparator stage are inverted. The outputs of the comparator and inverter stages are operatively connected with control nodes of the switches of the H-bridge. In this manner, the H-bridge control circuit controls the direction of current supplied to the bi-directional load. Further, the H-bridge control circuit can be adapted such that a dead gap voltage zone is provided, wherein no current is delivered to the bi-directional load when the control signal is within the dead gap, i.e. is between the first and second reference voltages.

According to another aspect of the invention, a method for regulating the temperature of an object is disclosed. The method includes the step of providing a bi-directional heat transfer element thermally coupled with the object. The bi-directional heat transfer element can be configured to actively draw heat from the object or deliver heat to the object based upon the polarity of a power supply current which supplies power to the bidirectional heat transfer element. A temperature sensor can be adapted to selectively supply a feedback signal indicative of the temperature of the object. When the feedback signal is supplied, an input control signal based on the feedback signal can be provided. When the feedback signal is not supplied, a dead gap signal, which is selected to prevent supply of power to the bi-directional heat transfer element, can be provided. The input control signal or dead gap signal can be compared with first and second reference signals to provide two compared signals. The compared signals can be inverted to provide two inverted signals. These four signals (the two compared signals and the two inverted signals) can be used to control the polarity and delivery of the power supply current to the bi-directional heat transfer element.

Circuits and methods according to certain embodiments of the present invention provide for regulation of the direction and supply of power to a bi-directional load based upon a single analog input signal. Some embodiments can provide for control of the load based upon feedback. Some embodiments include protective features in case the system is disconnected from feedback. Moreover, some embodiments prevent shoot-through current in an H-bridge power supply circuit. Each of these advantages can be realized in a system that is less complicated and includes fewer electronic components than some previously known devices.

Some embodiments can be used with a load that comprises a bi-directional thermoelectric heat transfer element. Such embodiments can be used to regulate and stabilize the temperature of an object such as, for example, systems with a high susceptibility to temperature changes. Some embodiments can provide for generally smooth temperature regulation allowing for ambient re-correction of temperature, thus decreasing hysteresis and conserving energy. Moreover, some embodiments can provide for selection of a regulated temperature. In addition, in some embodiments, the dead gap can be widened or narrowed. Accordingly, some embodiments provide for adjustment of the precision of regulation and the length of the transition period between heating and cooling states of the device. Some embodiments can be used for temperature regulation of an optical cell at an accuracy of about 0.2° C.

BRIEF DESCRIPTION OF THE DRAWINGS

The following drawings are illustrative of particular embodiments of the invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION OF ILLUSTRATIVE EMBODIMENTS

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

Figure 2:
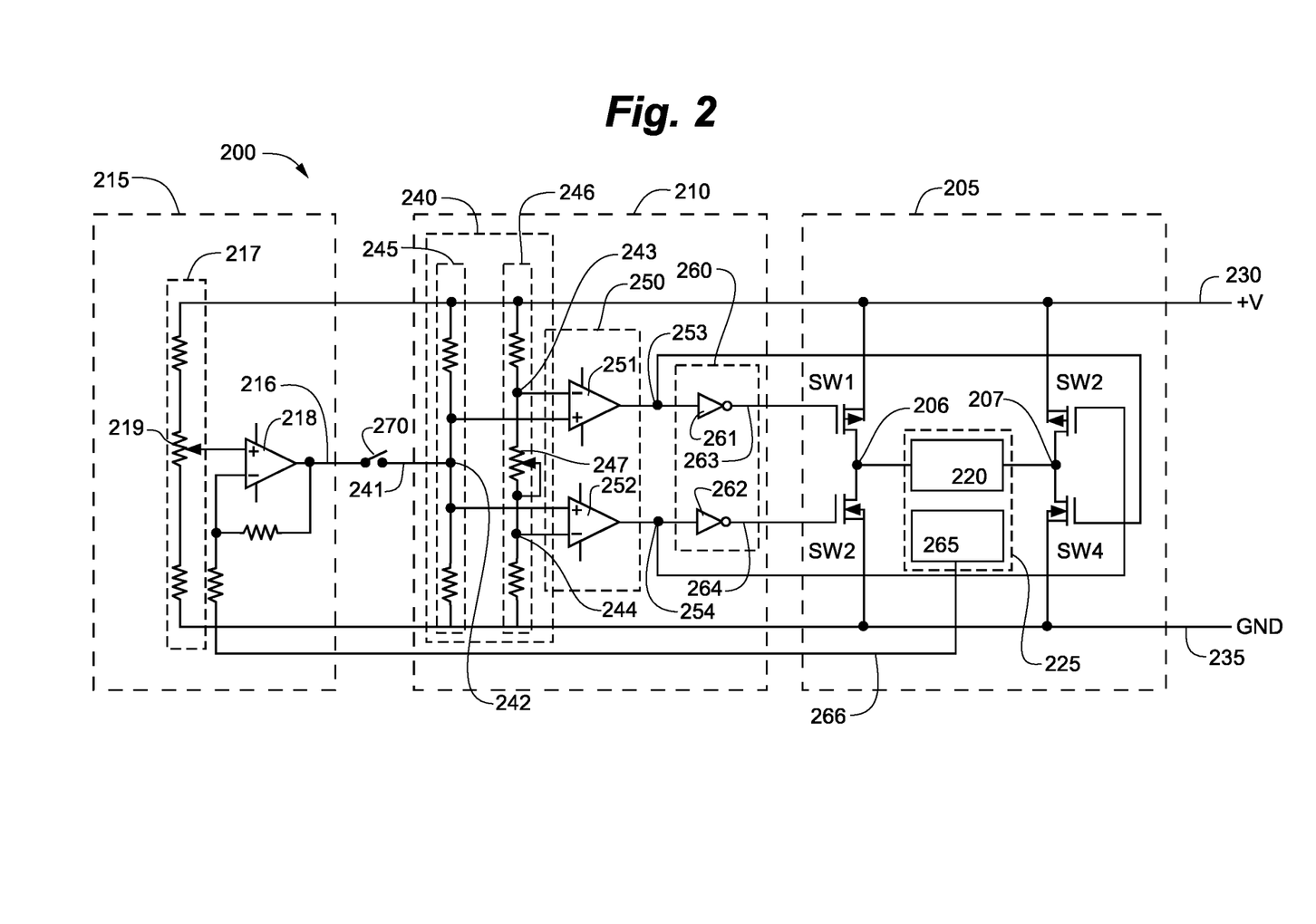
FIG. 2 is an electrical schematic diagram of an H-bridge control system according to some embodiments.

FIG. 2 shows a simplified electrical schematic of a circuit 200 according to some embodiments. The circuit 200 includes an H-bridge 205, H-bridge control circuit 210, and feedback stage 215 for driving a load 220. According to some embodiments, the load 220 can comprise an electrical device having bi-directional operation based upon the polarity of the supplied power. For example, the load 220 can comprise a thermoelectric Peltier conditioner which can be connected with a device 225 so as to selectively deliver heat to ("heat") or draw heat from ("cool") the device 225 based upon the polarity of the supplied power. Particular embodiments of the circuit 200 can be adapted for use with a device 225 that comprises an optical sensor and/or temperature regulated area about the optical sensor. For example, control circuits disclosed herein can be utilized in systems such as that disclosed in commonly owned and concurrently filed U.S. Patent Application 2009/0147822, now U.S. Pat. No. 8,071,390, filed Feb. 12, 2009, and titled "Temperature Stabilized Optical Cell", the entirety of which is herein incorporated by reference.

The H-bridge 205 of FIG. 2 is shown utilizing P-type and N-type MOSFETs as switches SW1, SW2, SW3, SW4. Each of the MOSFETs is configured such that its gate is utilized as a control node. The P-type MOSFETs SW1, SW2 are located at the high-side level of the bridge and the N-type MOSFETs SW3, SW4 are located at the low-side level of the bridge. The H-bridge 205 is powered from a unipolar power supply 230 having a voltage of +V connected at the positive side and ground 235 at the negative side.

An H-bridge control circuit 210 is used to control the state of each of the switches of the H-bridge 205. The H-bridge control circuit 210 includes an input stage 240, a comparator stage 250, and an inverter stage 260. The input stage 240, includes an input terminal 241 which is connectable to an analog input signal line 216 configured to provide an analog input signal which determines the operation of the H-bridge 205. The input stage 240 provides a control signal at a control signal node 242 based upon the analog input signal 216. In addition, the input stage 240 provides first and second reference signals at reference signal nodes 243, 244. In some embodiments, input divider 245 and reference voltage divider 246 are utilized to provide the control signal 242 and reference signals 243, 244, respectively.

The comparator stage 250 is connected with the input stage 240 at control signal node 242 and reference signal nodes 243, 244. The comparator stage 250 includes comparators 251, 252 configured to compare the control signal with the first and second reference signals. The outputs of the comparator stage 253, 254 provide inputs to the inverter stage 260. The inverter stage 260 includes two inverters 261, 262 which produce first and second inverted signals as outputs of the inverter stage 263, 264.

The outputs of the comparator stage 253, 254 and the inverter stage 263, 264 are connected with the control nodes of the H-bridge switches. In this embodiment, the outputs of the first comparator 253 and the first inverter 263 are connected with the control nodes, i.e. gates, of switches SW1 (P-type) and SW4 (N-type), respectively. Likewise, the outputs of the second comparator 254 and the second inverter 264 are connected with the control nodes of switches SW2 (P-type) and SW3 (N-type), respectively. Accordingly, the H-bridge control circuit 210 provides for full load control (i.e. polarity changing as well as "on/off" state) based upon a single analog input 216.

Some embodiments further include a feedback stage 215. The feedback stage 215 can receive a feedback signal (e.g. along feedback signal line 266) from a sensor 265 coupled with the device 225. Based upon the feedback signal, the feedback stage 215 can provide the analog signal input 216 to the H-bridge control circuit 210. In some embodiments, the feedback stage 215 comprises a feedback voltage divider 217 and amplifier 218. The feedback voltage divider 217 can include a potentiometer 219 or other mechanism providing for user input of a target device temperature. The feedback voltage divider 217 output (i.e. a signal representative of the target device temperature) and sensor feedback signal can be provided as inputs to the amplifier 218, the output of which can comprise the analog input signal. A switch 270 can be used to selectively connect or disconnect the feedback stage 215 with the H-bridge control circuit 210.

A sensor 265 can be coupled with the device 225, e.g. near the load, or otherwise positioned to receive feedback from the device 225. A sensor feedback line 266 can connect the sensor 265 to the feedback stage 215. In some embodiments, the sensor should be selected so as to provide feedback indicative of the load operation, for example, when the load is a Peltier conditioner or other temperature adjusting load, the sensor can comprise a temperature sensor. Of course, when other loads are utilized, the sensor can comprise a device suited for the intended operation, for example, if the load comprises a motor, the sensor can comprise a limit switch. In embodiments utilizing a temperature adjusting load, the temperature sensor can be an LM34 series semiconductor temperature sensor having a voltage output of approximately 10 mV/° F. Other temperature sensors, e.g. other semiconductor temperature sensors, thermoresistors, or thermocouples can be used with corresponding corrections in the circuit schematic to convert the temperature reading to an appropriate signal, e.g. as in FIG. 2, to a voltage.

An exemplary operation of devices according to some embodiments will be discussed with reference to FIG. 2. First, taking the case where switch 270 is open, i.e. the feedback stage 215 is disconnected from the H-bridge control circuit 210. Assuming, for simplicity, each of the resistors of the input divider 245 have the same resistance, the control voltage 242, i.e. the noninverting input of each comparator 251, 252, is about half of the power supply voltage 230. For example, if the power supply voltage 230 is +9 V the control node 242 between the resistors of the input divider 245 is at approximately +4.5 V. The first and second reference voltages 243, 244, i.e. the inverting inputs of each comparator 251, 252, reflect the voltage levels at the nodes of the reference voltage divider 246 about the "gap" potentiometer 247. Assuming, for simplicity, that each of the resistors of the reference voltage divider 246, including "gap" potentiometer 247, are selected so as to have equal resistances, the first reference voltage 243 is +6 V and the second reference voltage 244 is +3 V. Thus, the output of the first comparator 253 is low, i.e. about 0 V, because the inverting input has a higher potential (+6 V) than the noninverting input (+4.5 V). The output of the second comparator 254 is high, i.e. about +9 V, because the noninverting input has a higher potential (+4.5 V) than the inverting input (+3 V). Correspondingly, the output of inverter 263 is high, i.e. about +9 V, while the output of inverter 264 is low, i.e. about 0 V. In such conditions, all of the H-bridge switches are open (nonconductive) because both P-type MOSFETs SW1, SW2 have a high potential applied to their gates and both N-type MOSFETs SW3, SW4 have a low potential applied to their gates. Thus, under this condition, no power is applied to the load, and no shoot-through current passes through the H-bridge switches.

Now, the case where the input to the H-bridge control circuit 210 of FIG. 2, i.e. the voltage at input terminal 242, is changing will be discussed. This case can arise when an analog input signal is connected to the H-bridge control circuit 210. For example, the output of feedback stage 216 can be connected to the input terminal 242 under normal device operation e.g. by closing switch 270. Or, the system can be controlled manually or artificially by an adjusted voltage source connected directly to the input terminal 242. The circuit 200 operation will be discussed with reference to FIGS. 3-5, each of which shows a plurality of plots representative of the voltage at selected nodes versus input voltage applied at the input terminal 242. The plots include: Voltage at output of the first comparator 253 v. Input voltage (plots 305, 405, 505), Voltage at output of inverter 263 v. Input voltage (plots 310, 410, 510), Voltage at output of the second comparator 254 v. Input voltage (plots 315, 415, 515), Voltage at output of inverter 264 (plots 320, 420, 520), and Voltage across the load 220 (node 207-node 206) v. Input voltage (plots 325, 425, 525).

Figure 3:
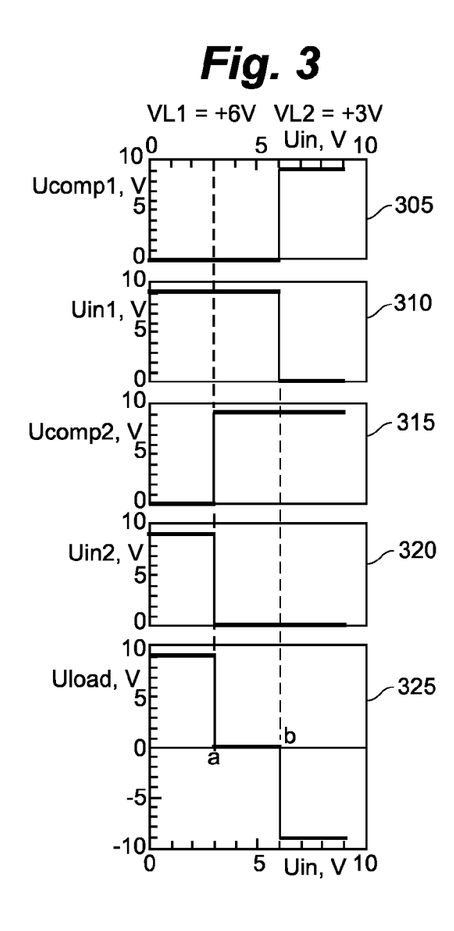
FIG. 3 shows a plurality of plots representative of signal values at various nodes of the schematic shown in FIG. 2, according to some embodiments having a first set of reference signals.

FIG. 3 is indicative of node voltages in a circuit having conditions such as those mentioned above (i.e. the resistances of the resistors of the input divider 245 and the reference voltage divider 246 are approximately equal). Under such conditions, the first reference voltage 243 is about +6 V and the second reference voltage 244 is about +3 V. In this case, the output of the second comparator 254 will switch at an input voltage of +3 V and the output of the first comparator 253 will switch at an input voltage +6V. For an input voltage from 0 V to +3 V, plot 315 indicates that the output of the second comparator 254 is low, i.e. approximately 0 V, keeping switch SW2 closed. Switch SW3 is also closed because the output of inverter 264, according to plot 320, is high, i.e. approximately +9 V. Conversely, switches SW1, SW4 are open because the output of the first comparator 253 is low. Thus, the load 220 is powered in a first direction such that node 207 is positive while node 206 is negative, i.e. current passes through the load 220 along the following path: power supply 230-switch SW2-node 207-load 220-node 206-switch SW3-ground 235.

For an input voltage from +3 V to +6 V, no power is supplied to the load 220. Within this voltage range, the output at the second comparator 254 changes from 0 V to +9 V, causing switches SW2 and SW3 to open. The output of the first comparator 253 remains unchanged, i.e. low. So all switches of the H-bridge 205 are open. A range of input voltages corresponding to a condition where all switches of the H-bridge are open, will be referred to herein as the "dead gap" voltage, $V_{gap}$ (i.e. between points "a" and "b" on plot 325 of FIG. 3). The presence of a dead gap can prevent shoot-through current caused by simultaneous activation (transition to conductive mode) of paired switches along a leg of the H-bridge (e.g. switches SW1 and SW3, or switches SW2 and SW4).

At an input voltage greater than +6 V, the load 220 is supplied with power in a second direction, which is opposite the previous case, i.e. the polarity is changed. In this case, the output of the first comparator 253 is high (+9V) such that switches SW1, SW4 are closed. At the same time, the output of the second comparator 254 remains high, causing switches SW2, SW3 to remain open. Thus, current passes through the load 220 along the following path: power supply 230-switch SW1-node 207-load 220-node 206-switch SW4-ground 235.

In some embodiments, the dead gap voltage $V_{gap}$ can be adjustable. Such adjustability can be provided, for example, as in FIG. 2, by the provision of an adjustable resistive element within the reference voltage divider 246. In this case, adjusting the resistance of "gap" potentiometer 247 can change the reference voltages at first and second reference nodes 243, 244. Increasing the resistance of the "gap" potentiometer 247 would provide for a wider dead gap, and decreasing the resistance would provide a narrower dead gap. An adjustable dead gap can help with the provision of an appropriate time delay for transitions between load polarity, e.g. between heating and cooling states where the load is a Peltier unit. In some embodiments, the transition time can be eliminated, rendering the load operational in unidirectional mode. However, in embodiments used for the regulation of temperature, the inclusion of a dead gap can be especially useful when the variance between desired device temperature and the ambient temperature is great. In such condition, circuits according to some embodiments can provide for smoother temperature regulation. This is because the dead gap allows for the ambient temperature to correct the device temperature when the thermoelectric load over-corrects, rather than switching directly to counter-polarity operation. Thus periods of inactivity can result for the thermoelectric load resulting in reduced energy consumption and decreased hysteretic effects. Additionally, as mentioned above, dead gap adjustability can help with the prevention of shoot-through current due to differences in device switching times.

Figure 4:
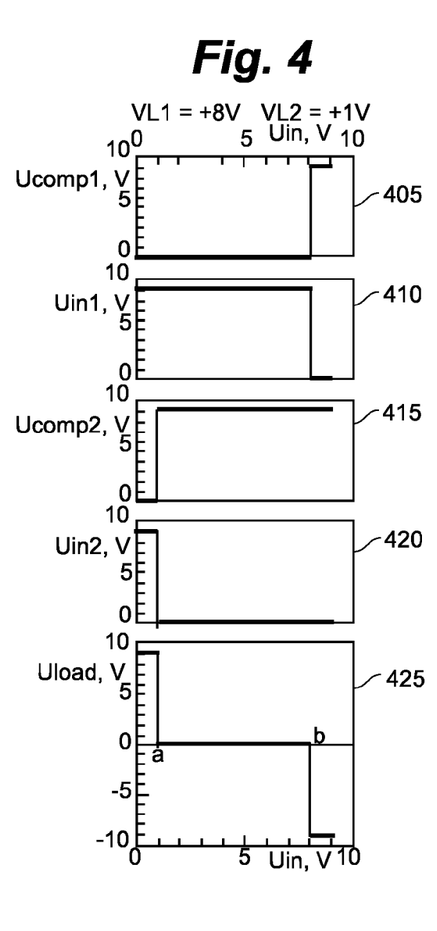
FIG. 4 shows a plurality of plots representative of signal values at various nodes of the schematic shown in FIG. 2, according to some embodiments having a second set of reference signals.
Figure 5:
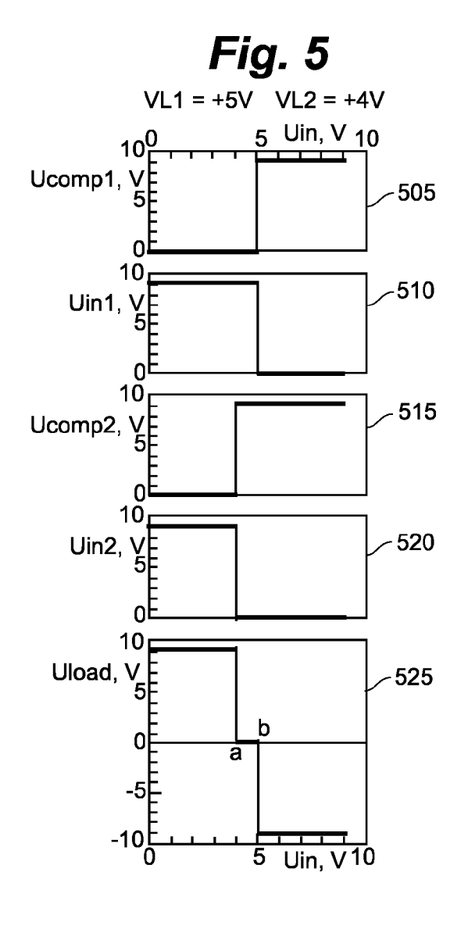
FIG. 5 shows a plurality of plots representative of signal values at various nodes of the schematic shown in FIG. 2, according to some embodiments having a third set of reference signals.

FIGS. 4 and 5 illustrate different dead gap sizes. In FIG. 4, the resistance of "gap" potentiometer 247 has been adjusted to seven times greater than that of each of the resistors in the reference voltage divider 246. Accordingly, the reference voltages at reference nodes 243, 244 are +8 V and +1 V, respectively. Thus a dead gap voltage $V_{gap}$ of 7 V is presented. FIG. 5 shows another case, wherein the resistance of the "gap" potentiometer 247 has been reduced to one fourth the resistance of the other resistors in the reference voltage divider 246. In this case, the reference voltages at reference nodes 243, 244 are +5 V and +4 V, respectively, the dead gap voltage $V_{gap}$ having been reduced to 1 V.

Where the input to the H-bridge control circuit 210 comprises, or is based on, a sensor feedback signal 266 in a system for temperature regulation 200, the dead gap voltage $V_{gap}$ can be shown to correlate with a temperature gap. Knowing the voltage range of the dead gap (see e.g. FIGS. 3-5), appropriate gain (amplification) of the feedback stage amplifier 218 can be selected. This selection can provide a sharply defined temperature interval corresponding to the dead gap voltage interval. The gain of amplifier 218 can be selected based upon the known values of temperature sensor sensitivity, dead gap voltage interval, and desired temperature gap. For example, where the dead gap voltage interval, $V_{gap}$, is 3 V, the temperature sensor sensitivity (conversion coefficient), $T_{coeff}$, is 10 mV/° F., and the necessary difference in temperature gap between cooling and heating, $T_{range}$, is 3° F., the gain of amplifier 218 can be determined by the following equation:

$$\text{GAIN} = V_{gap}/(T_{coeff} \times T_{range}) = 3[V]/(0.01[V/° F.] \times 3[° F.]) = 100 \quad [1]$$

The feedback stage 215 can also allow for the provision of the circuit set point. The circuit set point represents the target regulated value, e.g. desired temperature, which the system can aim to maintain. In some embodiments, the set point can be established by toggling a variable resistive element, e.g. potentiometer 219. It needs to be remembered that the voltage level set with potentiometer 219 is also multiplied by the gain of amplifier 218. For example, if the set point, i.e. the desired stable, average temperature that the system follows, is 70° F. and the conversion factor is 10 mV/° F., the output of the potentiometer 219 should provide a voltage of +0.7 V (i.e. (70° F.)×(10 mV/° F.)). To position the set point (70° F.) in the middle of the dead gap, assuming a dead gap voltage range of 3.0 V, the potentiometer 219 should be set such that a voltage of 0.715 V (i.e. 0.7 V+[(3.0 V/2)/100]) is applied to the noninverting input of the amplifier 218. Note, that in some embodiments, the operational amplifier offset must also be taken into account as well as additional regulation of power voltage for feedback voltage divider 217 to ensure set point (e.g. target temperature) stability.

Figure 6:
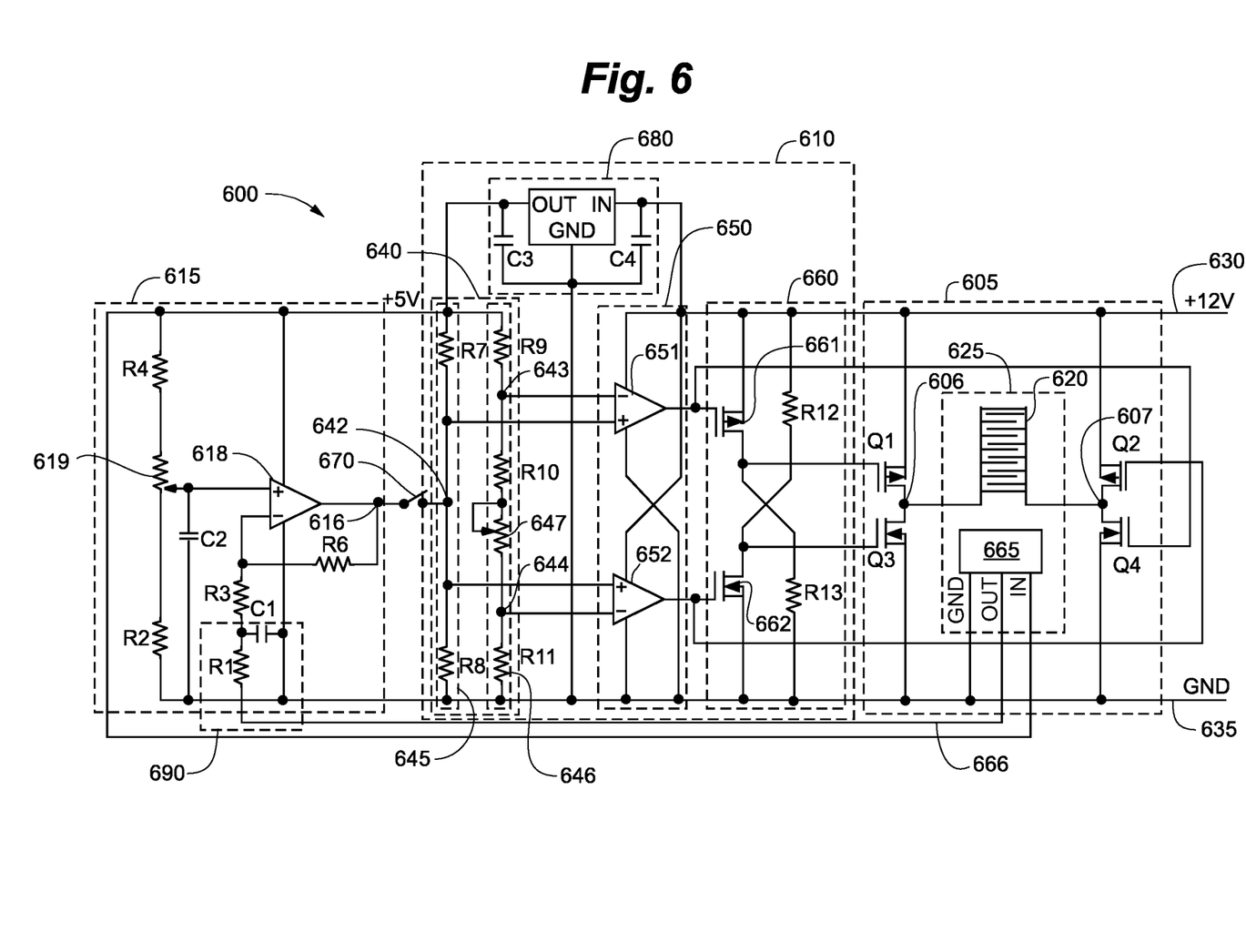
FIG. 6 is a detailed electrical schematic diagram an H-bridge control system according to some embodiments.

FIG. 6 shows an electrical schematic diagram of a temperature control unit 600 for regulating the temperature of a device 625 according to some embodiments. The device 625 contains a Peltier unit 620 connected across output nodes 606, 607 of the H-bridge 605. A temperature sensor 665 is in thermal contact with the device 625 and the Peltier unit 620.

The H-bridge 605 comprises four switches Q1, Q2, Q3, Q4. In some embodiments, the switches comprise power MOSFETs having a low e.g. about 5 mΩ, drain to source resistance during the "on" (conducting) state. The first and second comparators 651, 652 of the comparator stage 650 comprise operational amplifiers 651, 652 with an open feedback loop. The inverter stage 660 comprises low power MOSFETs 661, 662 each paired with a load resistor R12, R13. In this embodiment, a potentiometer 647 has been provided within the reference voltage divider 646 of the input stage 640 for selection of the dead gap voltage $V_{gap}$. The reference voltage divider 646 further includes a resistor R10 for providing a minimum dead gap voltage to prevent an accidental shoot-through current event during the adjustment of potentiometer 647. A step-down voltage regulator 680 is used to stabilize the dead gap zone $V_{gap}$ and desired temperature set position. In addition, the input stage 640 includes input divider 645 comprising resistors R7, R8. In some embodiments, the resistors R7, R8 can be chosen such that when switch 670 is open, the voltage at the control node 642 falls within the dead gap zone $V_{gap}$. For example, in some embodiments the resistors R7, R8 can have equal resistance such that the no-input-signal condition provides a voltage of half of the power supply voltage, or +2.5 V at the control node 642.

To set the desired temperature in an embodiment such as that shown in FIG. 6, the following algorithm can be utilized. First, disconnect the feedback stage 615 from the H-bridge control circuit 610 by opening switch 670. Connect a voltmeter to the output of the amplifier 616. Connect an adjustable voltage source to the inverting input of amplifier 618, replacing the input from sensor feedback line 666. Using the adjustable voltage source, apply a voltage corresponding to the desired temperature to the inverting input of the amplifier 618. For example, if the desired temperature is 68° F. (20° C.), the applied voltage should be +0.68 V (based upon a temperature sensor having a conversion factor 10 mV/° F. such as, e.g. an LM34 series temperature sensor). Then, adjust potentiometer 619 until the voltage level on the voltmeter corresponds with a desired set point location relative to the dead gap voltage zone $V_{gap}$. In some embodiments, this will correspond with a voltage level centered within the dead gap. For example, assuming a dead gap from +2 V to +3 V in the embodiment of FIG. 6, a centrally located set point would correspond with a voltage of +2.5 V. In some embodiments, the set point will not be centered within the dead gap, e.g. set to +3 V to correspond with a high end of the dead gap.

The necessary dead gap and temperature hysteresis between heating and cooling can be adjusted based upon the gain of amplifier 618 of feedback stage 615. An appropriate gain level can be evaluated according to the same basis as discussed above with regard to amplifier 218 of FIG. 2. Here, the gain can be set by adjusting or selecting the value of resistors R1, R3, R6. In this embodiment, the gain of amplifier 618 is: GAIN=R6/(R1+R3). Some embodiments include a filter 690, e.g. capacitor C1 forming an RC-filter with resistor R1, to smooth the feedback signal received from sensor feedback line 666. Such a filter 690 can be especially useful as the physical length of the feedback line 666 increases.

Figure 7:
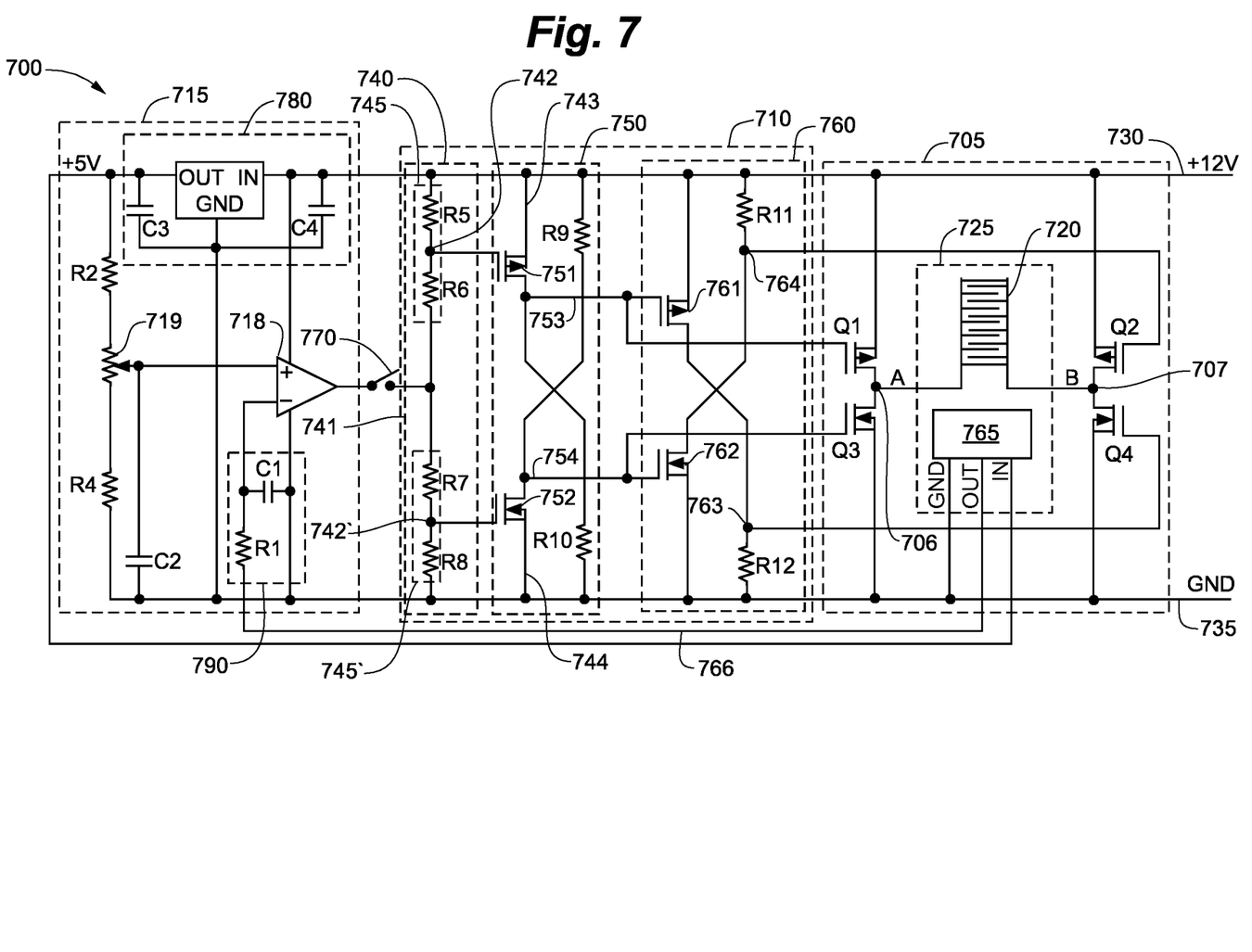
FIG. 7 is a detailed electrical schematic diagram of other variant of preferred embodiment of the invention.

FIG. 7 shows a schematic of an electronic circuit 700 which can be utilized to regulate the temperature of an optical cell 725 or other devices. Like the embodiments described above, this circuit includes an H-bridge 705 controlled by an H-bridge control circuit 710 which comprises an input stage 740, a comparator stage 750, and an inverter stage 760. This embodiment further includes a feedback stage 715 with power provided thereto by a voltage regulator 780. However, this embodiment includes slight variations from those described above to provide for simpler circuit operation based on a reduced number of component parts. Some embodiments according to this variant can be used to regulate temperature to an accuracy of about 0.2° C. or less, when utilized with a Peltier device, i.e. as the load 720.

The comparator stage 740 comprises a pair of transistors, e.g. MOSFETs 751, 752, instead of operational amplifier comparators. Because MOSFETs switch from cutoff to active mode based upon an applied gate voltage, they can be used as a passive comparator with respect to their gate threshold voltage. The gate threshold voltage can comprise approximately 1 V to 3 V depending upon technology of the transistor. For example, if both MOSFETs 751, 752 have gate threshold voltage of approximately +2 V, the N-type MOSFET 752 is cutoff when gate-source voltage is between 0 and +2 V (i.e. gate voltage is between 0 V and +2 V because the source here is ground 735, i.e. 0 V), and it is active when gate-source voltage is greater than +2 V. Likewise, the P-type MOSFET 751 is cutoff when gate-source voltage is between 0 and −2 V (i.e. gate voltage is between +10 V and +12 V because the source here is at power supply 730, i.e. +12 V), and it is active if gate-source voltage is lower than −2 V (i.e. gate voltage is less than 10 V). In some embodiments, the MOSFETs can be selected such that the transition voltage difference between open and closed conditions is very low i.e. less than about 0.2 V.

Thus, the input stage 740 of the embodiment of FIG. 7, varies slightly from that of the previously discussed embodiments. Here, the input stage 740 includes a pair of input dividers 745, 745' which operate upon the input signal at input terminal 741 to provide two separate control signals at control nodes 742, 742' rather than a single control signal. Each of these control signals are then compared, at the comparator stage 750, to reference signals 743, 744 with respect to the threshold voltages of each of the transistors 751, 752.

In operation, embodiments such as that of FIG. 7 still provide shoot-through current prevention as described above. For example, in a simple case, the input dividers 745, 745' of the input stage 740 comprise resistors having the same resistance, i.e. R5=R6=R7=R8=10 kΩ. When the control circuit 710 is disconnected from the feedback stage 715, the potential at the input terminal 741 is about half of the power supply voltage 730, i.e. +6 V, and the first and second control voltages 742, 742' are +9 V and +3 V, respectively. In this case, both MOSFETs 751, 752 are active. Thus, the output of the P-type MOSFET 751, i.e. the drain voltage, is +12 V and switches Q1 and Q4 of the H-bridge 705 are open (non-conductive) because the gate-source voltage of each is 0 V. Likewise, the output of the N-type MOSFET 752 is 0 V, rendering H-bridge switches Q2 and Q3 open. Thus, the H-bridge 705 is locked out if the control circuit 710 is disconnected from input (sensor feedback circuit 715 in this case), or the input voltage is half of the power supply voltage 730.

Extending this further, it can be realized that the H-bridge 705 is locked out if the potential applied at the input terminal 741 is within the interval from +4 V to +8 V. This range represents the dead gap $V_{gap}$ discussed above. If the potential applied to the input terminal 741 is lower than +4 V, the N-type MOSFET 752 is cutoff but the P-type MOSFET 751 remains active. In this condition, H-bridge switches Q2 and Q3 are closed, and H-bridge switches Q1 and Q4 are open; so the Peltier unit 720 is powered with positive potential at node 707 and negative potential at node 706. Reversed polarity power can be applied to the Peltier unit 720 by applying a potential greater than +8 V to the input terminal 741.

As with other embodiments, the dead gap $V_{gap}$ of the embodiment of FIG. 7 can be adjusted. Dead gap adjustment can be accomplished, for example, by changing the resistance of resistors R6 and/or R7. To maintain symmetry of the dead gap $V_{gap}$, both resistors R6, R7 should retain the same value. However, in some embodiments, it may be desirable to have asymmetrical operation. Likewise, resistors R5 and R8 need not be equal. At an extreme, assuming MOSFETs 751, 752 have thresholds of ±2 V, respectively, and the power supply voltage 730 is +12 V, the maximum dead gap range is +2 V to +10 V. This case corresponds with a shorting of resistors R6, R7. At the other extreme, increasing the resistance of resistors R6 and R7 is limited by the case where all H-bridge switches are open i.e. the dead gap is absent and shoot-through current destroys the H-bridge 705. As indicated, such operational ranges are determined as a function of the power supply voltage (i.e. the difference between power supply voltage 730 and ground 735) as well as the value of comparator MOSFETs 751, 752 gate-threshold voltages. The condition for dead gap presence using symmetrical dividers (i.e. R5=R8=R, R6=R7=R*) is:

$$R^*/R<(U_P/2U_{TH})-1, \qquad [2]$$

where $U_P$ is power supply voltage, and $U_{TH}$ is gate-threshold voltage.

Figure 8:
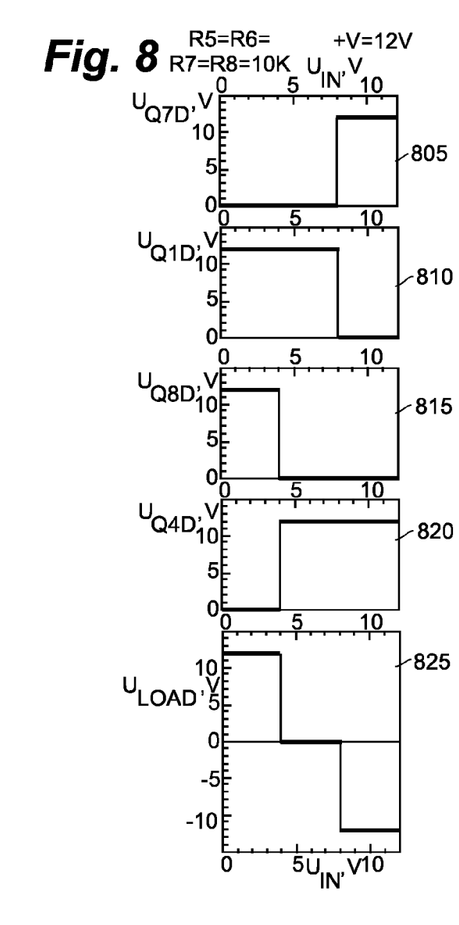
FIG. 8 shows a plurality of plots representative of signal values at various nodes of the schematic shown in FIG. 7, according to some embodiments having a first set of control signals.
Figure 9:
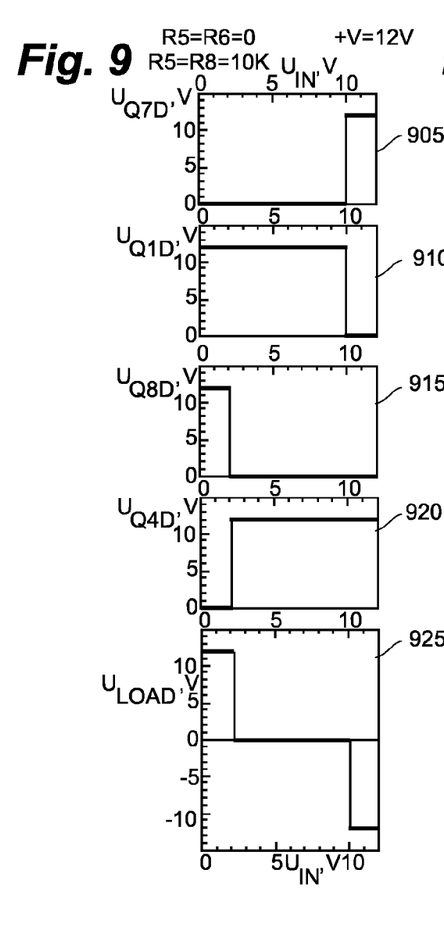
FIG. 9 shows a plurality of plots representative of signal values at various nodes of the schematic shown in FIG. 7, according to some embodiments having a second set of control signals.
Figure 10:
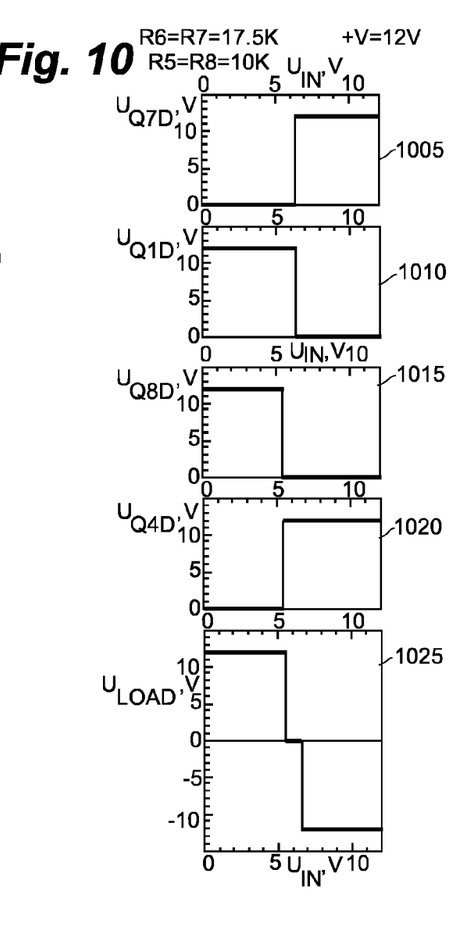
FIG. 10 shows a plurality of plots representative of signal values at various nodes of the schematic shown in FIG. 7, according to some embodiments having a third set of control signals.

FIGS. 8, 9, and 10 show a series of plots of input voltage versus node voltage for several nodes within the circuit 700 of FIG. 7. The plots include: Voltage at output of the first comparator 753 v. Input voltage (plots 805, 905, 1005), Voltage at output of the first inverter 763 v. Input voltage (plots 810, 910, 1010), Voltage at output of the second comparator 754 v. Input voltage (plots 815, 915, 1015), Voltage at output of the second inverter 764 (plots 820, 920, 1020), and Voltage across the load (Node 707-Node 706) v. Input voltage (plots 825, 925, 1025). These plots illustrate how different dead gap ranges can be achieved using different resistors ratios in the input dividers 745, 745'. FIG. 8 illustrates the case described above, i.e. where R5=R6=R7=R8. FIG. 9 shows the case where R6=R7=0. In this case, the dead gap is maximized such that it depends not on the resistors ratio, but solely upon the power supply voltage and threshold voltage. Accordingly, the condition [2] transforms to:

$$U_P>2U_{TH} \qquad [3]$$

FIG. 10, illustrates the case where R6=R7=17.5 kΩ, and R5=R8=10 kΩ. In this case, the dead gap has been reduced to 1 V.

Embodiments such as those of FIG. 7, may require an input signal having a higher degree of amplification. This is because of the parametric operation of the MOSFETs 751, 752, i.e. the MOSFETs do not switch sharply enough between cutoff to active mode as there is generally a region of ohmic operation between these states. Ideally, the MOSFET transitions are very sharp to minimize the transition time for H-bridge switches between open and closed conditions. Thus feedback stage 715 may be configured to provide sharper amplification than may otherwise be desired. In some embodiments, an operational amplifier 718 can be used in open loop mode, i.e. connected without feedback, as shown in FIG. 7, or connected with positive feedback to serve as a trigger.

Although the present invention has been described in considerable detail with reference to certain disclosed embodiments, the disclosed embodiments have been presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. An electronic circuit for powering a bi-directional load, comprising:
   an input stage comprising an input terminal connectable to an analog input signal, the input stage providing a control signal based upon the analog input signal, a first reference signal, and a second reference signal, the first reference signal being more positive than the second reference signal, and the input stage being configured such that when the analog input signal is not connected to the input stage, the control signal is between the first and second reference signals; a switch for operatively connecting the analog input signal with the input terminal; a comparator stage operatively connected to the input stage and configured to compare (a) the control signal with the first reference signal producing a first compared signal, and (b) the control signal with the second reference signal producing a second compared signal; and an inverter stage operatively connected to the comparator stage and configured to invert (a) the first compared signal producing a first inverted signal, and (b) the second compared signal producing a second inverted signal;

an H-bridge power supply circuit comprising a first switch operatively connected to the comparator stage to be controlled by the first compared signal, a second switch operatively connected to the comparator stage to be controlled by the second compared signal, a third switch operatively connected to the inverter stage to be controlled by the first inverted signal, and a fourth switch operatively connected to the inverter stage to be controlled by the second inverted signal, such that (a) when the control signal is greater than the first reference signal, the H-bridge circuit delivers current to the bi-directional load in a first direction, (b) when the control signal is less than the second reference signal, the H-bridge circuit delivers current to the bi-directional load in a second direction, and (c) when the control signal is between the first and second reference signals, the H-bridge circuit delivers no current to the bi-directional load; and a feedback stage operatively connected with the input stage and configured to provide the analog input signal based upon a feedback signal.

2. The electronic circuit of claim 1, wherein the bi-directional load comprises a Peltier conditioner.

3. The electronic circuit of claim 1, further comprising a sensor operatively connected with the feedback stage and configured to provide the feedback signal to the feedback stage.

4. The electronic circuit of claim 3, wherein the sensor provides feedback indicative of the operation of the load.

5. The electronic circuit of claim 3, wherein the sensor comprises a temperature sensor.

6. The electronic circuit of claim 1, further comprising a switch for operatively connecting the analog input signal with the input terminal.

7. The electronic circuit of claim 1, wherein the control signal comprises first and second control signals, the first reference signal comprises a positive voltage source, the second reference signal comprises ground, and the input stage comprises:

a first voltage divider operatively connected between the input terminal and the positive voltage source, the first voltage divider producing the first control signal; and a second voltage divider operatively connected between the input terminal and ground, the second voltage divider producing the second control signal, wherein at the comparator stage, the first control signal is compared with the first reference signal and the second control signal is compared with the second reference signal.

8. The electronic circuit of claim 1, wherein the input stage comprises:

a reference signal divider comprising (a) a first resistive element operatively connected between a positive voltage source and a first node, (b) a second resistive element operatively connected between the first node and a second node, and (c) a third resistive element operatively connected between the second node and ground, wherein the first reference signal is the voltage at the first node and the second reference signal is the voltage at the second node; and an input voltage divider comprising (a) a fifth resistive element operatively connected between the positive voltage source and the input terminal, and (b) a sixth resistive element operatively connected between the input terminal and ground, wherein the control signal comprises the voltage at the input terminal.

9. The electronic circuit of claim 8, wherein the second resistive element comprises an adjustable resistive element, thereby allowing for adjustment of the first and second reference signals.

10. An electronic circuit for powering a bi-directional load, comprising:

an H-bridge circuit comprising (a) a first switch operatively connected between a power supply and a first terminal of the load, such that the power supply and the first terminal of the load can be connected or disconnected based upon a first input signal delivered to a first control terminal, (b) a second switch operatively connected between the power supply and a second terminal of the load, such that the power supply and second terminal of the load can be connected or disconnected based upon a second input signal delivered to a second control terminal, (c) a third switch operatively connected between the first terminal of the load and ground, such that the first terminal of the load and ground can be connected or disconnected based upon a third input signal delivered to a third control terminal, and (d) a fourth switch operatively connected between the second terminal of the load and ground, such that the second terminal of the load and ground can be connected or disconnected based upon a fourth input signal delivered to a fourth control terminal; an input control terminal that is connectable to a DC control signal;

a switch for operatively connecting the DC control signal with the input terminal; a first voltage divider about the input control terminal such that when the DC control signal is not connected to the input control terminal the voltage at the input control terminal is within a dead gap of the electronic circuit;

a second voltage divider configured to provide a first reference signal at a first reference node and a second reference signal at a second reference node, wherein the first and second reference signals bound the dead gap;

a first comparator comprising (a) a first input operatively connected with the input control terminal, (b) a second input operatively connected with the first reference node, and (c) a first comparator output terminal operatively connected with the fourth control terminal of the H-bridge circuit;

a second comparator comprising (a) a first input operatively connected with the input control terminal, (b) a second input operatively connected with the second reference node, and (c) a second comparator output terminal operatively connected with the second control terminal of the H-bridge circuit;

a first inverter comprising (a) an input operatively connected with the first comparator output terminal, and (b) an output operatively connected with the first control terminal of the H-bridge circuit; and a second inverter comprising (a) an input directly connected with the output terminal of the second comparator and not with the output terminal of the first comparator, and (b) an output operatively connected with the third control terminal of the H-bridge circuit.

11. The electronic circuit of claim 10, wherein the bi-directional load is a Peltier device.

12. The electronic circuit of claim 10, further comprising:
a sensor configured to provide a feedback signal which is indicative of the operation of the bi-directional load; and
a feedback circuit adapted to produce the DC control signal based upon a user-provided, desired operation of the bi-directional load and the feedback signal.

* * * * *